United States Patent [19]

Yoshida et al.

[11] Patent Number: 5,027,601
[45] Date of Patent: Jul. 2, 1991

[54] LOW BOILING POINT MEDIUM RECOVERY APPARATUS

[75] Inventors: Takao Yoshida, Tokyo; Masato Kurisu, Fukuoka; Kouichi Sugaya, Tokyo, all of Japan

[73] Assignee: Kajima Corporation, Tokyo, Japan

[21] Appl. No.: 504,904

[22] Filed: Apr. 5, 1990

[30] Foreign Application Priority Data

Apr. 10, 1989 [JP] Japan .................................. 1-87955[U]

[51] Int. Cl.$^5$ ............................................. F01K 25/08
[52] U.S. Cl. ...................................... 60/641.5; 60/651; 60/671
[58] Field of Search ................. 60/641.2, 641.3, 641.5, 60/669, 651, 671

[56] References Cited

U.S. PATENT DOCUMENTS 4,262,485 4/1981 Kuroda et al. ........................ 60/669

Primary Examiner—Allen M. Ostrager
Attorney, Agent, or Firm—Wenderoth, Lind & Ponack

[57] ABSTRACT

A binary cycle power recovery apparatus which comprises, in combination, a steam separator for separating steam from hot water, a hot water tank where hot water is produced by directly introducing the steam from the steam separator into water; a heating and evaporating means installed in the hot water tank for heating and evaporating a liquid working medium by the hot water in the tank, a turbine derived by the evaporated working medium from the heating and evaporating means, a condenser for condensing the gaseous working medium from the turbine, and a pump for circulating the condensed working medium from the condenser to the heating and evaporation means. The internal power for working the apparatus is reduced and the heat exchange efficiency is improved. As a result, the apparatus may be constructed in a small size adapted for use, for example, by a private administrator of a small hot spring hotel to recover electric power or cold heat source from waste steam which has heretofore been discarded.

15 Claims, 2 Drawing Sheets

LOW BOILING POINT MEDIUM RECOVERY APPARATUS

FIELD OF THE INVENTION

The present invention relates to a low boiling point medium power recovery apparatus for converting low-temperature differential energy, such as naturally occurring heat energy of geothermal hot water or hot springs and factory waste heat energy into electricity or cooling heat sources for cooling or refrigerating purposes. More particularly, it relates to a small and practically useful low boiling point medium power recovery apparatus which has in a small size due to reduction of the internal power and improvement of the heat exchange efficiency of the apparatus and which may be utilized even by a private administrator of a small hot spring hotel to convert readily available district energy into electric power or cooling heat source.

PRIOR ART

A binary cycle is a system for heating a working medium such as from and ammonia by a heat source such as geothermal or hot spring heat and factory waste heat and recovering the vapor energy of the working medium as a power source for turbine rotation.

Figure 1:
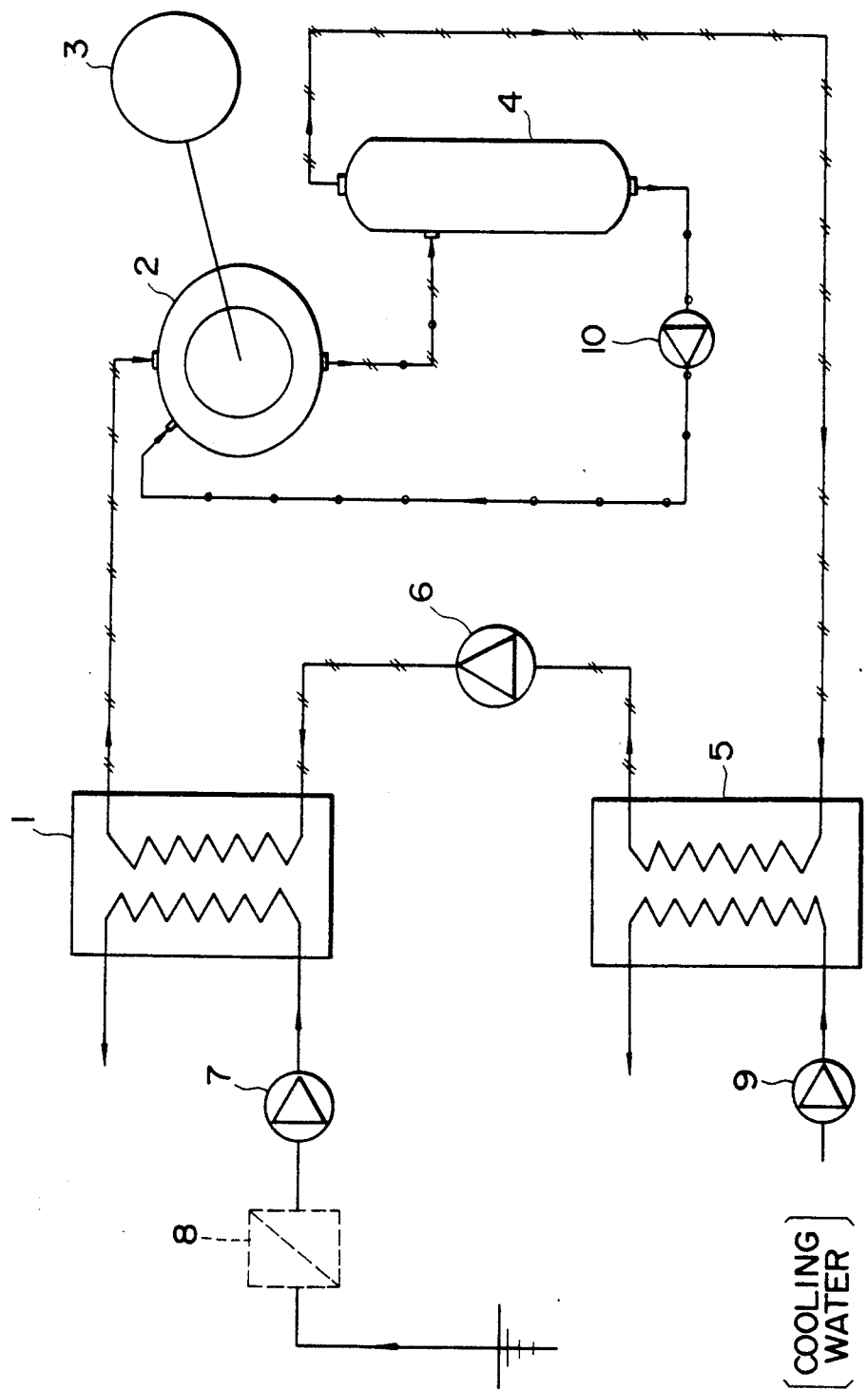
FIG. 1 is a system diagram of a typical low boiling point medium power recovery apparatus according to the prior art.

FIG. 1 is a system diagram of a typical low boiling point medium power recovery apparatus according to the prior art in which reference numerals designate 1 an evaporator, 2 a turbine, 3 a generator, 4 an oil separator, 5 condenser and 6 a pump for circulating a working medium, respectively. Hot water heated by geothermal heat, hot spring heat or factory waste heat is introduced by a pump for hot water 7 to the evaporator 1 where it is utilized as a low boiling point heat source for evaporating a working medium. When the hot water contains scales or the like, it is heat exchanged by a heat exchanger 8 to provide hot water free from scales or the like, which is introduced to the evaporator 1. The working medium evaporated in the evaporator 1 is then utilized to drive the turbine 2, passed through the oil separator 4 and then condensed in the condenser 5 thereby generating a back pressure. The working medium liquified in the condenser 5 is returned to the evaporator 1 by means of the circulating pump 6. Through the condenser 5, cooling water is caused to pass by a cooling water pump 9. Lubricant oil for the turbine 2 leaving the turbine 2 together with the working medium is separated from the working medium in the oil separator 4, and circulated to the turbine 2 by an oil pump 10. By such a system, geothermal heat or the likes can be recovered as electrical power. Accordingly, taking into consideration the fact that fossilized fuels will be exhausted in the very near future, the development of such a binary cycle power recovery apparatus is eagerly desired as a technology for recovering low-temperature differential energy which is almost indefinitely available on the earth.

Problems to be solved

The conventional low boiling point medium system requires many internal power consuming means including, a pump for hot water (designated by reference numeral 7 in FIG. 1), a pump for lubricant oil (designated by reference numeral 10 in FIG. 1) and a pump for cooling water (designated by reference numeral 9 in FIG. 1). Accordingly, it is necessarily of a large size in order to effect recovery of enough power to compensate for the investment. Further, with heat exchange systems normally used in the conventional low boiling point medium system, the evaporator and condenser are required to be large-sized for effective utilization of low-temperature differential energy. As a result, the conventional low boiling point medium system has been economically satisfactory only in a case wherein a great quantity of geothermal heat is recovered with a large-sized apparatus.

In Japan, there are 105 or more places where high-temperature hot springs exceeding 90° C. are available. At all of these places, however, no low boiling point medium power recovery apparatus has been utilized by any private administrator of a small hot spring hotel for the reasons described above, and a large quantity of heat of the hot springs is normally released in the form of steam into the atmosphere.

The invention seeks to solve the problems discussed above, and an object of the invention is to provide a small and practically useful low boiling point medium power recovery apparatus in which the internal power needed for working the apparatus is reduced and the heat exchange efficiency is improved.

Constitution of the Invention

A low boiling point medium power recovery apparatus according to the invention comprises, in combination, a steam separator for separating steam from hot water which is geothermal or due to factory waste heat;

a hot water tank where hot water is produced by directly introducing the steam from said steam separator into water;

a heating and evaporating means installed in said hot water tank for heating and evaporating a low boiling point liquid working medium by the hot water in said tank, a turbine driven by the evaporated working medium from said heating and evaporating means, a condenser for condensing the gaseous working medium from said turbine, and a pump for circulating the condensed working medium from said condenser to said heating and evaporation means.

The heating and evaporating means installed in the hot water tank is preferably a combination of a heater comprising a plurality of tubes which are disposed in the hot water tank and through which the liquid working medium is caused to pass with a flash chamber into which the heated liquid working medium from the heater is flashed. Preferably an oil separator is provided in a passage for the working medium communicating the heater with the flash chamber so that the separated oil may be supplied to the turbine.

The condenser is preferably a shell-and-tube heat exchanger comprising a shell containing a liquid working medium and tubes which are disposed in the shell and through which cooling water is caused to pass, the shell being provided with a means for directly introducing the gaseous working medium from the turbine into the liquid working medium contained in the shell, whereby the liquid and gaseous working mediums may undergo direct heat exchange therebetween in said shell.

Function of the Invention

The evaporator acts to separate hot-temperature water due to geothermal heat or factory waste heat into steam and hot water. According to the invention steam is collected from the hot-temperature water, which steam has heretofore been discarded and is utilized herein as a heat source to operate the binary cycle power recovery apparatus. Accordingly, the hot water from which steam has been separated may be used as such, for example, as hot water for a hot spring bath.

The hot water tank acts to heat water contained therein by bubbling the steam from the evaporator into the water to provide hot water by direct heat exchange between the water contained in the tank and the steam introduced therein. Water formed by condensation of the steam is also stored in the water tank.

The heating and evaporating means installed in the hot water tank acts to heat and evaporate a liquid working medium passing through the hot water tank by the hot water in the tank. The heating and evaporating means is preferably a combination of a heater comprising a plurality of tubes which are disposed in the hot water tank and through which the liquid working medium is caused to pass with a flash chamber into which the heated liquid working medium from the heater is flashed for evaporation. Heat required for the heating and evaporation of the liquid working medium is extracted from the hot water in the tank. The heat exchange between the hot water and working medium may effectively proceed, since bubbles of the steam are continuously introduced into the tank, and thus, the hot water in the tank is stirred.

Preferably, an oil separator is provided in a passage for the working medium communicating the heater with the flash chamber so that the separated oil may be supplied to the turbine. The oil separator acts to separate oil from the heated liquid working medium coming from the heater based on the density difference between the oil and liquid working medium, and is preferably disposed in the hot water tank. The separation of oil is not necessarily complete. The oil rich liquid working medium obtained in the oil separator is supplied to the turbine while retaining its elevated temperature and pressure. Oil contained in the liquid working medium transferred to the flash chamber, is less liable to be evaporated than the liquid working medium, and therefore, accumulates at the bottom of the flash chamber together with a quantity of the liquid working medium. The oil which has accumulated at the bottom of the flasher is withdrawn and returned to the heater.

The condenser acts to cool and condense a mixed gas of the gaseous working medium and oil which has left the turbine by introducing the mixed gas into a condensate to effect direct gas-liquid heat exchange. This direct introduction of the gas to be condensed into the condensate enhances the heat exchange efficiency, whereby the condenser may be made small in size. Gases insoluble in the condensate such as inert gas may be separated from the condensate at the top of the condenser.

EXAMPLE

A preferred embodiment according to the invention will now be described in detail with reference to FIG. 2 of the attached drawings.

Figure 2:
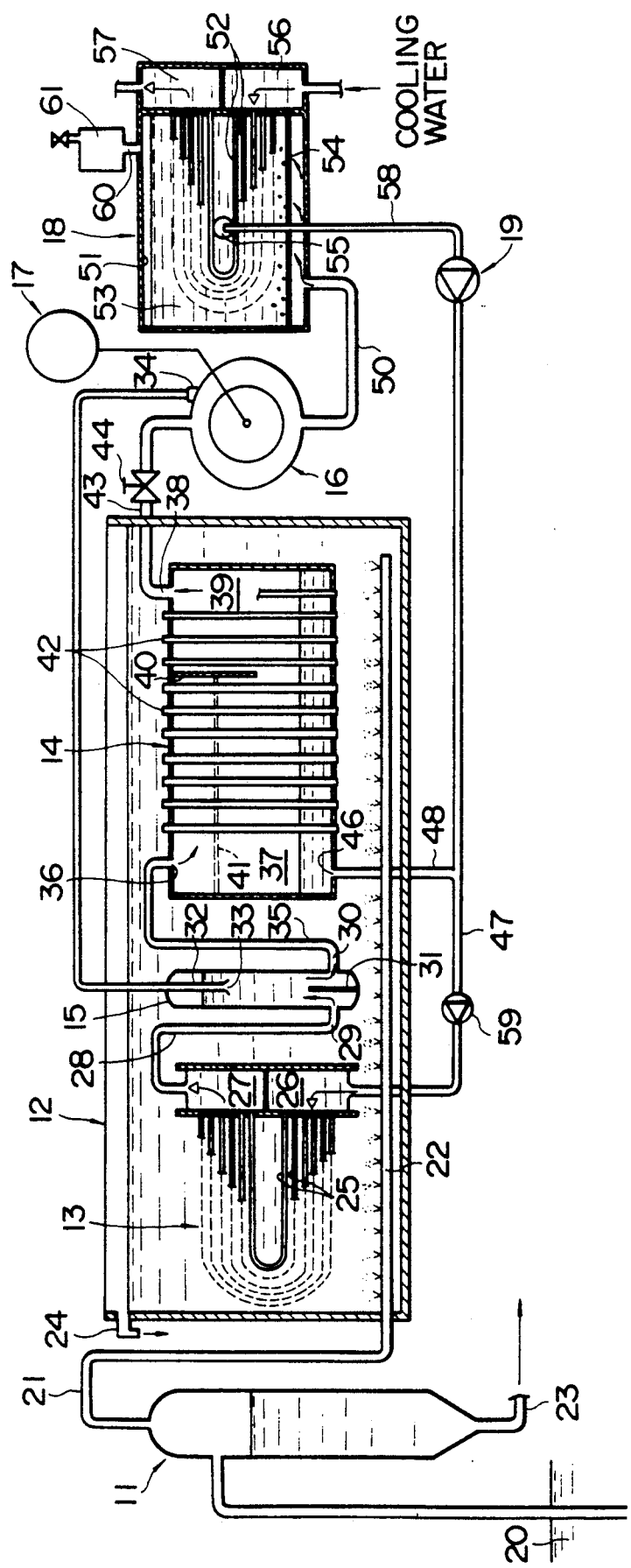
FIG. 2 is schematic vertical cross-section of a low boiling point medium power recovery apparatus according to the invention.

In FIG. 2, there are shown a steam separator 11, a hot water tank 12, a heater 13 for heating a liquid working medium and installed in the hot water tank, a flash chamber 14 installed in the hot water tank, an oil separator 15, an expander 16 for recovering power (a turbine), a generator 17, a condenser 18, and a pump 19 for circulating the liquid working medium, respectively.

High pressure water (high-temperature water+-steam) is introduced by its own high pressure into the steam separator 11, where it is separated into steam and high-temperature water. The steam is guided through a steam pipe 21 to steam draft nozzles 22 arranged at the bottom of the hot water tank 12, while the high-temperature hot water is withdrawn through a hot water pipe 23 and may be used, for example, as hot water for use in hot spring baths. Since the steam has a certain amount of pressure, although not enough for turbine rotation, there is no need to use a pump for its transport and there is no loss of heat upon transport, as is the case with transport of hot water.

The hot water tank 12 contains hot water and has a plurality of steam draft nozzles 22 arranged at the bottom thereof so that steam bubbles will be distributed in all portions of the hot water contained in the tank. The steam introduced gives up its heat to the water in the tank to become water, and an increased amount of hot water is removed from the tank 12 via an overflow pipe 24. In the hot water tank, there are installed the heater 13 for heating a liquid working medium and the flash chamber 14 for evaporating the heated liquid working medium at locations so that they will be contacted by the steam bubbles. The oil separator 15 is provided between the heater 13 and flash chamber 14.

The heater 13 may be of a simple structure comprising a plurality of tubes 25 through which a liquid working medium is caused to pass and which are arranged in the hot water. The illustrated heater 13 comprises a lower header 26 into which the liquid working medium is introduced, an upper header 27 from which the heated liquid working medium is withdrawn and a plurality of U-shaped tubes arranged in the hot water with their tube axes held horizontal, which tubes communicate the headers 26 and 27. Around the tubes, heat supply and liquid stirring by steam bubbles proceeds, resulting in effective liquid-liquid heat exchange between the hot water in the tank and the liquid working medium flowing through the tubes 25. The heated liquid working medium is withdrawn from the upper header 27 through a passage 28 to the oil separator 15.

The oil separator 16 acts to separate lubricant oil accompanied by the liquid working medium in accordance with difference in density. The illustrated oil separator comprises a vertical tube having liquid working medium inlet 29 and outlet 30 at bottom side walls of the tube with a baffle plate 31 between the inlet 29 and is outlet 30, and provided with an oil extraction pipe 32 having a mouth 33 opened at an upper portion of the tube. When the heated, and thus pressurized liquid working medium passes through the oil separator 15, oil having a specific gravity smaller than that of the liquid working medium accumulates at an upper portion of the tube and spontaneously flows out owing to liquid pressure together with a quantity of the liquid working medium through the mouth 33 into the oil extraction pipe 32, which is communicated with an oil supply inlet 34 of the turbine 16. Generally, lubricant oil dissolves in a working medium, but when heated it tends to separate. In order to advantageously utilize this property of the oil it is preferable to dispose the oil separator itself in the hot water in the tank 12, also. In the apparatus according to the invention almost all of the oil content is separated from the liquid working medium and spontaneously supplied by liquid pressure to the turbine 16. Thus, in the apparatus according to the invention, there is no need to use an oil pump as is the case with the prior art illustrated in FIG. 1, and it is possible to use an oil separator which is smaller and more simple than that used in the prior art. The liquid working medium leaving the oil separator 15 from the outlet 30 is introduced through a pipe 35 into the flash chamber 14.

The flash chamber 14 is a vessel for flashing the high-temperature and high-pressure liquid working medium supplied through the pipe 35 into a chamber having a volume much larger than that of the pipe 35, thereby evaporating the working medium. The vessel is divided into a flasher room 37 having a liquid working medium inlet 36 at an upper portion of one side of the vessel and a steam super heater room 39 having a gaseous working medium outlet 38 at an upper portion of the other side of the vessel, by a partition wall 40. The partition wall 40 is present only at an upper portion of the vessel, and below the partition wall 40 the flasher and steam super heater rooms 37 and 39 are not separated. The flasher room 37 is provided with a flashing plate 41 comprising a perforated plate extending horizontally in the room below the liquid working medium inlet 36 but above the lower end of the partition wall 40, from which plate 41 the liquid working medium is dropwise supplied for promoting evaporation. There are provided a plurality of heat exchange pipes 42 vertically penetrating both the flasher and steam super heater rooms 37 and 39. Each heat exchange pipe 42 is an open ended tube penetrating both bottom and ceiling plates of the room 37 and 39, through which steam bubbles from the steam draft nozzles 22 may ascend. Thus, in the heat exchange pipes there is present hot water in the tank 12 being heated and stirred by steam bubbles, which hot water effectively gives up heat to the working medium passing through the flash chamber, promoting evaporation of the working medium in the flasher room 37 and super heating (gasification of any mist) of the vapor in the steam super heater room 39. The gaseous working medium so formed is passed through a pipe 43, controlled by a valve 44 and sent to the turbine 16 for rotation thereof. Liquid which has not been gasified (including oil) accumulates and is withdrawn through a liquid extraction outlet 46 provided at the bottom of the flash chamber 14. The liquid extraction outlet 46 is communicated via a connecting pipe 48 with a pipe 47 for feeding the liquid working medium to the heater 13 by means of a pump 59.

A mixed fluid of the working medium and oil leaving the turbine 16 is directly introduced to the condenser 18 through a pipe 50. Namely, in the apparatus according to the invention an oil separator and an oil pump are not installed between the turbine and condenser as is the case in the prior art shown in FIG. 1. While the condenser 18 used herein may have a structure similar to the conventional shell-and-tube condenser comprising a shell 51 in which a plurality of tubes for passing cooling water are provided, it differs from the conventional shell-and-tube condenser in that the condensate 53, the liquid working medium, is always retained in the shell 51 at such a level that the tubes 52 are completely submerged in the condensate 53. More particularly, the condenser 18 comprises the shell 51 with its axis held horizontal containing the liquid working medium and the tubes 52 which are disposed in the shell with their axes held horizontal and through which cooling water is caused to pass, the shell 15 being provided with a perforated nozzle 54 for directly introducing the gaseous working medium from the turbine 16 into the liquid working medium contained in the shell 51, the shell 51 being also provided with an outlet 55 for withdrawing the liquid working medium at the central or lower portion thereof, the shell 51 being filled with the liquid working medium so that the tubes 52 are substantially submerged. The illustrated condenser further comprises a lower header 56 into which cooling water is introduced, an upper header 57 from which the cooling water is withdrawn and a plurality of U-shaped tubes 52 arranged in the condensate 53 within the shell 51 with their tube axes held horizontal, which tubes communicate the headers 56 and 57. The mixed fluid (substantially gaseous) leaving the turbine 16 is introduced in the form of bubbles through the perforated nozzle 54 into the condensate 53 retained in the shell 51 of the condenser 18, and comes in direct contact with the condensate 53 being cooled by the tubes 52, whereby it is cooled and condensed, and combined with the condensate 53. Since bubbles of the gaseous working medium introduced into the condensate stir the condensate and directly contact with the condensate 53 with large contact areas, the cooling and condensation of the gaseous working medium proceeds effectively proceeds. This gas-liquid direct heat exchange makes it possible to effectively condense the mixed fluid containing oil which has left the turbine 16, thereby making it unnecessary to provide an oil separator between the turbine and condenser. Because of the absence of any oil separator between the turbine 16 and condenser 18, the back pressure of the condenser 18 is directly transmitted to the turbine 16, contributing to enhancement of the power recovery efficiency.

An increased amount of the condensate formed in the condenser 18 is withdrawn from the outlet 55 via a pipe 58, and circulated to the heater 13 by means of the pump 19.

Incidentally, while the pump 59 is provided in the pipe 47 for transporting the liquid withdrawn from the flash chamber 14 to the heater 13 via the pipes 48 and 47, this pump 59 is for the purpose of circulation only within the heating and evaporating means, and therefore, it is free from any pressure load and need only overcome fluid resistance such as friction involved, so that the capacity of the pump 59 may be very small.

The condenser 18 is provided with an exit for exhausting a gas at the top of the shell 51, through which gases such as an inert gas formed within the system may be removed via a gas chamber 61.

Effect of the Invention

Advantageous results of the apparatus according to the invention are as follows.

In the apparatus according to the invention, steam from hot water which has heretofore normally been released into the atmosphere is utilized as the heat source. The hot water itself may be used as such, for example, as hot water for hot spring baths. Since the steam is supplied to the hot water tank by its own pressure, a hot water pump need not be used. Since the steam is brought in direct contact with water to provide hot water, all of the heat possessed by the steam is fully utilized.

The gasification of the liquid working medium is carried out in the heater and flash chamber disposed in the hot water which is undergoing stirring by steam bubbles. Accordingly, even with a small-sized heater and flash chamber, heat exchange required for sufficient gasification of the liquid working medium can be achieved.

Since the condenser is constructed as a gas-liquid direct heat exchanger, it exhibits a good heat exchange efficiency, and thus, even with a small sized condenser, satisfactory condensation of the gaseous working medium can be achieved.

In the apparatus according to the invention, lubricant oil for the turbine can be concentrated during the cycle and returned to the turbine without using no oil pump. Thus, any oil pump and no power for driving an oil pump are necessary. In particular, because of the absence of any oil separator between the turbine and condenser, the back pressure of the condenser is directly transmitted to the turbine, enhancing the power recovery efficiency.

To summarize, the internal power for working the apparatus is reduced and the heat exchange efficiency is improved. As a result, the apparatus according to the invention may be constructed with a small size adapted for use, for example by a private administrator of a small hot spring hotel to recover electric power or heat cooling from waste steam which has heretofore been discarded.

What is claimed is:

1. A low boiling point medium power recovery apparatus which comprises, in combination:
   a steam separator for separating steam from hot water from a source such as geothermal, factory waste heat, and the like;
   a hot water tank connected to said steam separator for producing hot water by steam directly introduced therein from said steam separator;
   a heating and evaporating means installed in said hot water tank for heating and evaporating a liquid working medium by the hot water in said tank;
   a turbine connected to said heating and evaporating means and driven by the evaporated working medium from said heating and evaporating means;
   a condenser connected to said turbine for condensing the gaseous working medium from said condenser to said heating and evaporating means.

2. The power recovery apparatus in accordance with claim 1 wherein said heating and evaporating means is a combination of a heater comprising a plurality of tubes which are disposed in the hot water tank and through which the liquid working medium is caused to pass and a flash chamber into which the heated liquid working medium from said heater is flashed.

3. The power recovery apparatus in accordance with claim 2 further comprising a passage for the working medium communicating said heater with said flash chamber and an oil separator in such passage and connected with said turbine for supplying the separated oil to said turbine.

4. The power recovery apparatus in accordance with claim 2 or 3 wherein said flash chamber is provided with heat exchange pipes through which the hot water in said tank and bubbles of the steam introduced into said tank may pass.

5. The power recovery apparatus in accordance with claim 4 wherein said flash chamber is provided with an exit for liquid at the bottom thereof, and a pipe for the working medium which communicates said condenser with said heater and to which said exit is connected.

6. A low boiling point medium power plant which comprises, in combination:
   a steam separator for separating steam from hot water geothermal, factory waste heat, or the like;
   a hot water tank connected to said steam separator for producing hot water by steam directly introduced therein from said steam separator;
   a heating and evaporating means installed in said hot water tank for heating and evaporating a liquid working medium by the hot water in said tank;
   a turbine connected to said heating and evaporating means and driven by the evaporated working medium from said heating and evaporating means;
   a condenser connected to said turbine for condensing the gaseous working medium from said turbine; and
   a pump connected between said condenser and said heating and evaporating means for circulating the condensed working medium from said condenser to said heating and evaporating means,
   wherein said condenser is a shell-and-tube heat exchanger having a shell for containing a liquid working medium and tubes disposed in said shell and means for passing cooling water through said tubes, said shell having a means for directly introducing the gaseous working medium from said turbine into a liquid working medium contained in said shell, whereby the liquid and gaseous working mediums undergo direct heat exchange therebetween in said shell.

7. The low boiling point medium power plant in accordance with claim 6 wherein said heating and evaporating means is a combination of a heater comprising a plurality of tubes disposed in said hot water tank and through which the liquid working medium is caused to pass and a flash chamber into which the heated liquid working medium from said heater is flashed.

8. The low boiling point medium power plant in accordance with claim 7 further comprising a passage for the working medium communicating said heater with said flash chamber and an oil separator in said passage and connected with said turbine for supplying the separated oil to said turbine.

9. The low boiling point medium power plant in accordance with claim 7 or 8 wherein said flash chamber is provided with heat exchange pipes through which the hot water in said tank and bubbles of the steam introduced into said tank may pass.

10. The power recovery apparatus in accordance with claim 9 wherein said flash chamber is provided with an exit for liquid at the bottom thereof, and a pipe for the working medium which communicates said condenser with said heater and to which said exist is connected.

11. A low boiling point medium power plant which comprises, in combination:
    a steam separator for separating steam from hot water geothermal, factory waste heat, or the like;
    a hot water tank connected to said steam separator for producing hot water by steam directly introduced therein from said steam separator;
    a heating and evaporating means installed in said hot water tank for heating, and evaporating a liquid working medium by the hot water in said tank;

a turbine connected to said heating and evaporating means and driven by the evaporated working medium from said heating and evaporating means;

a condenser connected to said turbine for condensing the gaseous working medium from said turbine; and a pump connected between said condenser and said heating and evaporating means for circulating the condensed working medium from said condenser to said heating and evaporating means, wherein said condenser is a shell-and-tube heat exchanger having a shell for containing a liquid working medium and tubes disposed in said shell and means for passing cooling water through said tubes, said shell having a means for directly introducing the gaseous working medium from said turbine into a liquid working medium contained in said shell, whereby the liquid and gaseous working mediums undergo direct heat exchange therebetween in said shell, and wherein said shell has an exit for exhausting a gas at the top thereof and an outlet for withdrawing liquid working medium at the central or lower portion thereof.

12. The low boiling point medium power plant in accordance with claim 11 wherein said heating and evaporating means is a combination of a heater comprising a plurality of tubes disposed in said hot water tank and through which the liquid working medium is caused to pass and a flash chamber into which the heated liquid working medium from said heater is flashed.

13. The low boiling point medium power plant in accordance with claim 11 further comprising a passage for the working medium communicating said heater with said flash chamber and an oil separator in said passage and connected with said turbine for supplying the separated oil to said turbine.

14. The low boiling point medium power plant in accordance with claim 12 or 13 wherein said flash chamber is provided with heat exchange pipes through which the hot water in said tank and bubbles of the steam introduced into said tank may pass.

15. The power recovery apparatus in accordance with claim 14 wherein said flash chamber is provided with an exit for liquid at the bottom thereof, and a pipe for the working medium which communicates said condenser with said heater and to which said exist is connected.

* * * * *